July 29, 1969   HANS JOCHEN TIMMERBEIL ET AL   3,457,599
STRIP-SHAPED STRAPPING, PARTICULARLY FOR PRESSED BALES
Filed Dec. 22, 1967                         4 Sheets-Sheet 4

INVENTOR

United States Patent Office 3,457,599
Patented July 29, 1969

3,457,599
STRIP-SHAPED STRAPPING, PARTICULARLY FOR
PRESSED BALES
Hans Jochen Timmerbeil and Hugo Timmerbeil, Jr.,
Schwelm, Westphalia, Germany, assignors to Titan
Eisenwarenfabrik G.m.b.H., Schwelm, Westphalia,
Germany
Filed Dec. 22, 1967, Ser. No. 692,750
Claims priority, application Germany, Dec. 22, 1966,
T 32,832
Int. Cl. B65d 63/02
U.S. Cl. 24—20
11 Claims

ABSTRACT OF THE DISCLOSURE

A strip-shaped bale tie having overlapping ends provided with manually engageable fastening elements constituted by stepped slots spaced from the edges of the strip and web portions between the slots and the edges and bent in opposite directions out of the plane of the strip.

---

The invention concerns strip-shaped ties, in particular for compressed bales, in which the opposite ends of the tie have a plurality of fastening elements which are interengageable to form a manually operable fastening joining the ends of the tie together in overlapping relationship, the fastening elements comprising stepped slots spaced from the edges of the strip, and in which the webs thus formed between the slots and the edges of the strip are bowed out of the plane of the strip in opposite directions on opposite sides of the strip to form an opening directed transversely to the plane of the strip and in which the shoulders formed by the slots overlap when in the fastened position.

The strength of fastenings of this type depends on the one hand, on the load-carrying cross-sectional area of the webs on either side of the first slot in each end of the tie, and on the other hand, on the sum of the moments of resistance to deflection of the interengaging shoulders of the fastening elements.

Generally a plurality of fastening elements are provided spaced along the axis of the tie in each of the overlapping ends. Each fastening element comprises either a single stepped slot or two or more stepped slots parallel to each other.

With ties of this type, however, the fastening elements extend over a substantial length of the strip, so that, when the ends are fastened together, there is a long overlap. Therefore, a relatively large amount of material is required in forming the tie. A further disadvantage, particularly when the fastening elements comprise slots arranged in pairs along the length of the strip, is that by forming the slots the load carrying area of the tie is reduced and so the tie is weakened, particularly in the region of the tie where the row of fastening elements commences.

The object of the present invention is to provide a strip-shaped tie of the type described above in which the fastening elements occupy only a short length in each end of the tie, but which are interengageable to form a fastening of high strength between the overlapping ends of the tie.

In accordance with the invention this object is substantially achieved by providing a bale tie of the type described above in which each end of the strip is provided with at least three such fastening elements spaced longitudinally along the strip, the two end fastening elements consisting of a single stepped slot and the intermediate fastening element or elements consisting of two or more stepped slots arranged in parallel across the width of the strip. This provides in a simple manner that by the parallel arrangement of a plurality of stepped slots in the intermediate fastening elements providing interengaging shoulders, the over all length of the fastening is kept short, and by the arrangement of the two end fastening elements, each consisting of a single slot the load-carrying cross-sectional area of the strip at each end of the fastening is weakened by a minimum amount. Thus, in spite of its short length, the fastening is of great strength. Between the first and last fastening element in each end of the strip the cross-sectional area can be so weakened by the parallel arrangement of the plurality of stepped slots that the sum of the remaining load-carrying cross-sectional areas of both overlapping ends of the strip is equal to the remaining load-carrying cross-sectional area at the first or the last fastening element at either end of the strip.

In ties in which the webs curved out of the plane of the strip have a maximum degree of deflection, the maximum deflection of the first and of the last fastening element at each end of the strip can with advantage be laterally displaced with respect to the middle of the slot. In this case the maximum deflections can be arranged relative to each other laterally displaced in opposite directions with respect to the middle of the slot. This ensures that the upper end of the strip does not lift away from the underneath end and the underneath end of the strip does not lift away from the upper strip.

The shoulders in all the fastening elements with advantage have equal overlap areas whereby, both on the top side and the underside of the fastening, the overlap areas are equally supported in the fastening position and have equal overlap areas and the length of the overlap region is equal to or greater than twice the thickness of the strip. This ensures that all the interengaging shoulders are of equal size and therefore have an equal amount of resistance to deflection. As the length of the overlap region is equal to or greater than twice the thickness of the strip, the interengaging shoulders have a sufficient moment of resistance to deflection.

It is of advantage for the amount of relative longitudinal movement required between the overlapping ends of the tie to bring the fastening elements into the fastening position to be equal in all fastening elements. This ensures that when the tie is fastened, all the interengaging shoulders come simultaneously into engagement.

The maximum width of the opening before the fastening elements are loaded is with advantage equal to or greater than 1.2 times the thickness of the strip. This ensures that when the strapping is fastened, the interengaging shoulders can be introduced into the openings formed by the slots in spite of the burr formed when the slots are punched.

When pushed out of the plane of the strip the webs formed on each side of the stepped slots are to advantage pushed or bent upwardly and downwardly out of the plane of the strip to an equal extent. This ensures that the webs pushed upwardly and downwardly out of the plane of the strip are each elongated to the same extent. By this arrangement the cut edges of the webs pushed out of the plane of the strip are of equal length in development in all the fastening elements.

The invention is illustrated in a number of embodiments in the accompanying drawings, in which.

Figure 15:
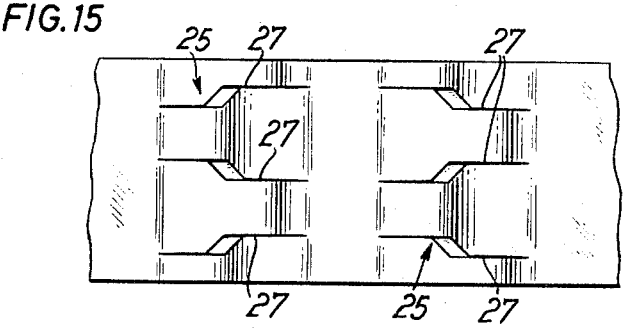
Figure 16:
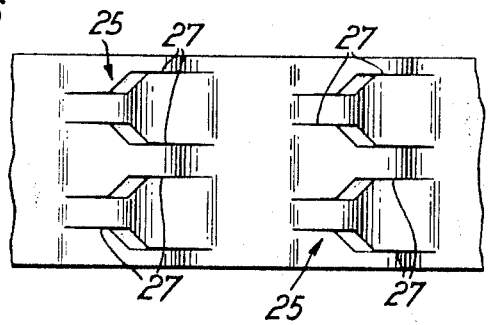

FIGS. 15 and 16, respectively, show partial plan views of additional embodiments.

Referring to the drawings, the ties are manufactured to the required size and the fastening elements are preformed in each end using conventional apparatus which need not be described further. If desired, several strips can be joined in one continuous length with lines of weakness at intervals so that the ties can be broken off by hand as required.

In the embodiments shown in the drawings, the metal tie or strip is generally indicated at 21. The two ends of the tie are indicated at 22 and 23, 22 indicating the underneath end of the tie and 23 indicating the upper end.

Figure 1:
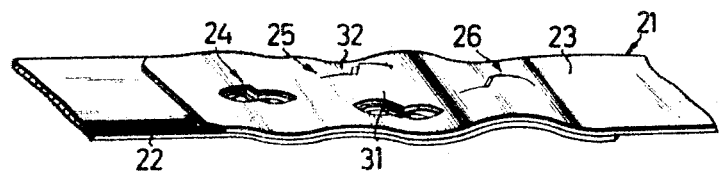
FIG. 1 shows a diagrammatic view of a first embodiment of a metal bale tie according to the invention.
Figure 2:
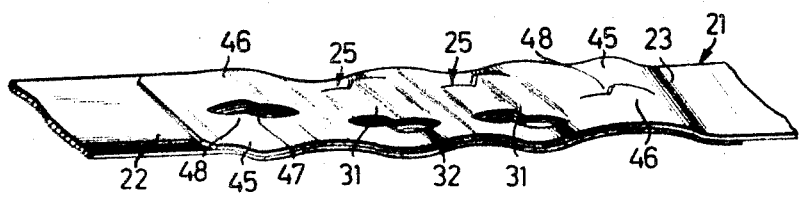
FIG. 2 shows a diagrammatic view of a second embodiment.

As is particularly shown in FIGS. 1 and 2, the overlapping ends of the tie are provided with fastening elements 24, 25 and 26. The fastening elements 25 comprise a pair of stepped slots 27 arranged in mirror-image to each other, extending substantially parallel to the longitudinal direction of the ends 22, 23 of the tie. The slots 27 comprise a region 28 extending parallel to the longitudinal centre line of the tie and passing into a central region 29 which extends at an angle toward the outer edge of the tie and which in turn runs out into an open end region 30 extending parallel to the longitudinal centre line of the tie.

The central webs 31 formed between the pairs of slots 27 are curved upwardly out of the plane of the strip, while the longitudinal webs 32 formed between the slots 27 and the edge of the tie are curved downwardly. When pressed out of the plane of the strip the webs 31, 32 formed by the slots 27 are pressed or curved upwardly and downwardly out of the plane of the strip to an equal extent. This ensures that the cut edges of the webs 31, 32 pressed out of the plane of the strip are of an equal length in development. This ensure that the webs 31, 32 are only curved out of the plane of the strip and are not elongated.

Figure 8:
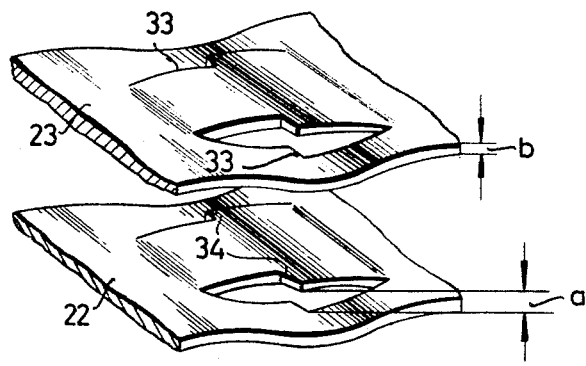
FIG. 8 shows a diagrammatic view of a single pair of slots in the end of a tie according to the invention, the ends of the tie being arranged at a distance from each other.
Figure 9:
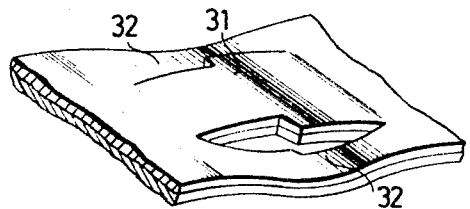
FIG. 9 shows a diagrammatic view of the pair of slots, the two ends of the tie lying one upon the other before full engagement.

The maximum width of the opening $a$ formed by the curvature of the webs 31, 32 is at both ends 22, 23, equal to or larger than 1.2 times the thickness $b$ of the strip before the fastening element 25 is loaded (cf. in particular FIG. 8). This ensures that the ends 22, 23 of the strip can be hooked into engagement by hand in spite of the burr due to the stamping of the slots 27. As the slots 27 in the underneath end 22 of the strip lie closer together than the slots 27 in the upper end 23 of the strip, the upwardly curved central webs 31, formed by the slots 27 of the underneath end 22 of the strip, can be inserted between the downwardly curved lateral webs 32, formed by the angle slots 27 of the upper end 23 of the strip. The distance between the slots 27 of the underneath end 22 of the strip is only a few tenths of a millimetre smaller than the distance between the slots 27 in the upper end of the strip. This small difference in the distances between the slots 27 in the underneath end 22 and the upper end 23 of the strip is however sufficient to permit the ends to be joined by hand, in spite of the burr resulting from the stamping of the slots 27.

Figure 10:
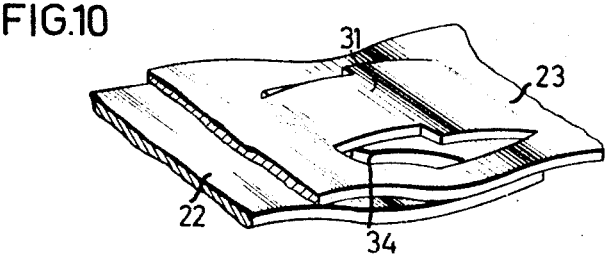
FIG. 10 shows a diagrammatic view of the pair of slots, the fastening being fully engaged.
Figure 11:
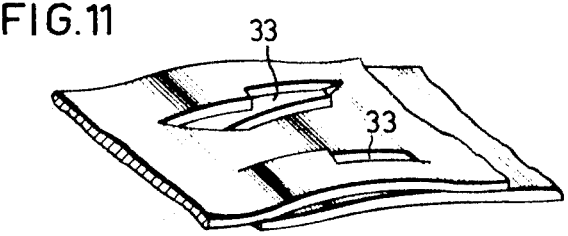
FIG. 11 shows a diagrammatic view of the underside of the fastening element as shown in FIG. 10.

As is particularly shown in FIGS. 10 and 11, when the fastening is engaged the underneath end 22 of the strip engages with the shoulders 33 provided on the central web 31 and formed by the angular shape of the slots 27 into the openings formed by the angle slots 27 in the upper end 23 of the strip, while the upper end 23 of the strip engages with the shoulders 34 provided at the lateral webs 32 and formed by the angular shape of the slots 27 into the openings formed by the angle slots 27 in the underneath end 22 of the tie. The shoulders 33 of the underneath end 22 of the strip and the shoulders 34 of the upper end 23 of the strip therefore come into reciprocal engagement.

As is particularly shown in FIG. 1, fastening elements 24 and 26 consisting of a single stepped slot 37 and 38, respectively, are arranged on either side of the fastening element 25 which is formed by a pair of stepped slots 27. Each of these slots 37 and 38 comprises a region 39 and 40 extending parallel to the longitudinal centre line of the metal strip passing into a central region 41 and 42 extending obliquely towards the outer edge of the metal strip, which central region 41 and 42 in turn runs out into an end region 43 and 44 extending parallel to the longitudinal centre line of the metal strip. The central region 41 in the case of the slot 37 is directed toward one side, while the central region 42 of the slot 38 extends toward the other side. In the case of these fastening elements 24, 26 to the webs 45, 46 formed between slots and the edge of the strip are curved out of the plane of the strip in opposite directions. The webs 45 are curved downwardly and the webs 46 are curved upwardly. When the fastening is engaged, the underneath end 22 of the strip engages with the shoulders 47 provided on the web 46 and formed by the angular shape of the slots 37, 38 into the openings formed by the angle slots 37, 38 in the upper end 23 of the strip, while the upper end 23 of the strip engages with the shoulders 48 provided at the web 45 and formed by the angular shape of the slots 37, 38 into the openings formed by the slots 37, 38 in the underneath end 22 of the strip. The shoulders 47 of the underneath end 22 of the strip and the shoulders 48 of the upper end 23 of the strip therefore also come into reciprocal engagement.

When pressed out of the plane of the strip, in the case of these fastening elements 24, 26 the webs 45, 46 formed by means of the slots 37, 38 are also pressed out or curved upwardly and downwardly out of the plane of the strip in an equal amount. The maximum width of the opening formed by the angle slots and the curvature is also equal to or greater than 1.2 times the thickness of the strip before the fastening is loaded. The cut edges of the webs 45, 46 pressed out of the plane of the strip are of equal length.

In addition, in all these fastening elements 24, 25 and 26 the displacement necessary between the two ends of the tie to bring the fastening elements into full engagement is the same. This ensures that all the fastening elements 24, 25 and 26 come simultaneously into their full load-carrying condition and the metal strip fastening can withstand a high tensile loading. The arrangement according to the invention of a fastening element 24, 26, comprising a single slot 37 or 38, on each side of the fastening element 25 provides that the fastening can withstand a substantially higher tensile loading. A fastening element 24, 26 comprising a single slot 37, 38 is provided at each of the ends of the fastening, which means that in the region of the weakened section the ends 22, 23 of the strip are only interrupted by a central region 41, 42 extending at an angle to the longitudinal centre line of the strip, so that the reduction in the sectional areas of the strip is less in comparison with a fastening element 25 comprised of two slots 27 arranged in mirror image to each other.

Figure 3:
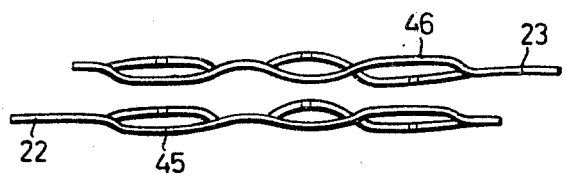
FIG. 3 shows a side view of a tie according to the invention, the ends of the strip being spaced at a distance from each other.
Figure 4:
FIG. 4 shows a side view of the tie of FIG. 3 with the ends of the strip lying one on top of the other and before relative longitudinal movement of the two ends to bring the fastening elements fully into engagement.
Figure 5:
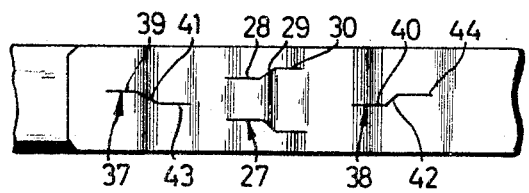
FIG. 5 shows a plan view of the tie shown in FIG. 1.
Figure 6:
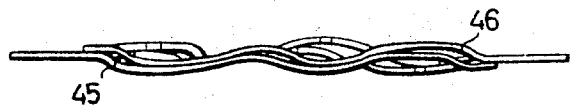
FIG. 6 shows a side view of FIG. 5 with the fastening elements fully in engagement.
Figure 7:
FIG. 7 shows a side view of a further embodiment according to the invention in the fastened position.
Figure 12:
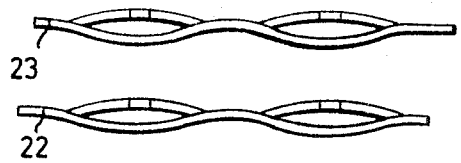
FIG. 12 shows a side view of a part of a metal tie according to the invention, the two ends of the strip being arranged at a distance from each other.
Figure 13:
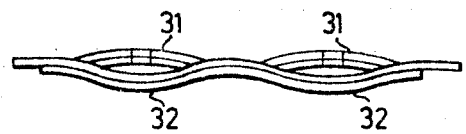
FIG. 13 shows a side view of FIG. 12 but with the two ends of the strip lying one upon the other before full engagement.

As already mentioned, the webs 45, 46 formed by the slots 37, 38 are curved out of the plane of the strip toward different sides thereof. The webs 45, 46 curved out of the plane of the strip have a maximum deflection which is laterally displaced with respect to the middle of the slot. As is particularly shown in FIGS. 3, 4 and 6, the maximum deflections are arranged relative to each other laterally displaced in opposite directions with respect to the middle of the slot 37 or 38. This ensures that the upper end 23 of the strip does not lift away from the underneath strip and the underneath end 22 of the strip does not lift away from the upper strip. In the case of the fastening element 25 which comprises two slots 27 arranged in mirror image to each other, the maximum deflections occur in the middle of the webs 31, 32 so that, as is particularly shown in FIG. 7, the ends 22, 23 lift slightly away from each other when the fastening is secured. As the fastening elements 25 are however enclosed by the fastening elements 24, 26, the ends of the strip are held together at the ends of the fastening.

In all the fastening elements 24, 25 and 26 the interengaging shoulders 33, 34, 47, 48 have equal overlap areas, whereby, both on the top side and on the underside of the fastening the overlap areas are equally supported in the fastening position and have equal overlap areas, the length of the overlap region being equal to or greater than twice the thickness of the strip. This ensures that the interengaging shoulders 33, 34, 47, 48 are not deflected by the tensile load, which would result in the fastening opening. Being of the same size, the interengaging shoulders of one end 22 or 23 of the strip have the same strength as the shoulders of the other end 23 or 22 of the strip.

In the embodiment shown in FIG. 2, two fastening elements 25 each formed of two angle slots 27 arranged in mirror image to each other, are provided between the fastening elements 24, 26, each of which is formed by a single slot 37 and 38 respectively.

Figure 14:
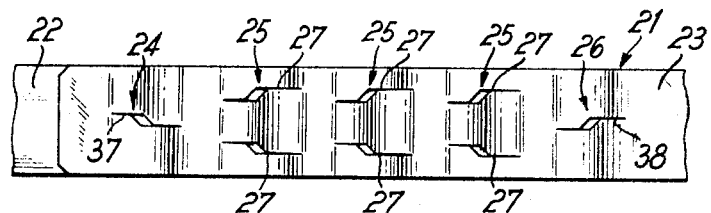
FIG. 14 shows a plan view of a further embodiment.

In the embodiment shown in FIG. 14, there are provided, between the fastening elements 24 and 26 respectively formed by the stepped slots 37 and 38, three fastening elements 25, each formed by two stepped slots 27 which are mirror symmetrically arranged with respect to each other. In the embodiment only partially shown in FIG. 15, there are three fastening elements 25 provided each of which comprises three stepped slots 27. It is to be understood that the arrangement only partially shown in FIG. 15 includes also fastening elements 24 and 26, not shown in FIG. 15 which are respectively located ahead and behind the fastening elements 25. As shown in FIG. 15, each of the stepped slots 27 of each fastening element 25 formed by three such stepped slots, is mirror symmetrically arranged to the respective adjacent stepped slot 27. In addition, the three stepped slots 27 of each fastening element 25 are arranged, mirror symmetrically with respect to the three stepped slots 27 of the adjacent fastening element 25, as likewise shown in FIG. 15.

The webs formed by the three stepped slots 27 of each fastening element 25 are alternatingly to opposite sides bent out of the plane of the strip in the same manner as described above in connection with the previously described embodiments. The widths of the web on each strip end which are respectively bent out of the plane of the strip toward the other strip end, are smaller than the widths of the webs on each strip end which are respectively bent out of the plane of the strip from the other strip end in the opposite direction. In this way it is also possible with the embodiment shown in FIG. 15 to manually engage the fastening elements.

Finally, in the embodiment partially shown in FIG. 16, each of the fastening elements 25 is formed by four stepped slots 27. It is to be understood also in this arrangement fastening elements 24 and 26, as shown in FIG. 14, are respectively arranged forwardly and rearwardly of the fastening elements 25. Each of the stepped slots 27 of each of the four such stepped slots which form a fastening element 25 is mirror symmetrically arranged with respect to its respective adjacent stepped slot 27.

The webs formed by the four stepped slots 27 of each fastening element 25 are again alternatingly to opposite sides bent out of the strip. The widths of the webs on each strip end which are bent toward the other strip end are also in this embodiment smaller than the widths of the webs on each strip end which are respectively bent in the opposite direction from the other strip end out of the plane of the strip so that also in this embodiment manual engagement of the fastening elements is possible.

We claim:

1. A bale tie of the type comprising a metal strip in the opposite ends of which are formed a plurality of fastening elements, the fastening elements in one end of the strip being adapted to be engaged manually with the fastening elements in the opposite end of the strip to join the ends of the strip together in overlapping relationship, said fastening elements each comprising at least one longitudinally extending stepped slot formed in the strip spaced from the edges thereof with the metal of the strip on each side of the slot being bent out of the plane of the strip in opposite directions, wherein each end of the strip is provided with at least three such fastening elements spaced longitudinally along the strip, the two end fastening elements consisting of a single stepped slot and the intermediate fastening element consisting of at least two stepped slots arranged in mirror image to each other and substantially parallel to the longitudinal direction of the ends of the strip and opposite one another.

2. A tie according to claim 1, wherein the point of maximum deformation of the webs bent out from the plane of the strip on each side of said end fastening elements consisting of said single stepped slot is longitudinally displaced relative to the centre of the slot.

3. A tie according to claim 2, wherein the point of maximum deformation of the web on one side of the single stepped slot is displaced from the centre of the slot in the opposite direction to the displacement of the point of maximum deformation of the web on the other side of the slot.

4. A tie according to claim 1 wherein, when fastened, the shoulders of the fastening elements in the two ends of the tie overlap each other a distance such that the overlap area is the same for all the fastening elements.

5. A tie according to claim 4, wherein the length of the overlap region of the shoulders of the interengaging fastening elements is at least equal to twice the thickness of the tie.

6. A tie according to claim 1, wherein the relative longitudinal displacement between the overlapping ends of the tie required to bring the fastening elements into engagement is the same for all the fastening elements.

7. A tie according to claim 1, wherein the maximum spacing between the edges of the webs bent out in opposite directions on each side of the stepped slots before the tie is loaded is at least equal to 1.2 times the thickness of the tie.

8. A tie according to claim 1, wherein the webs on each side of the stepped slots are bent out of the plane of the tie in an equal amount.

9. A tie according to claim 1, wherein the developed lengths of the cut edges of the webs bent out of the tie on each side of each slot are all the same.

10. A tie according to claim 1, wherein there are at least two intermediate fastening elements in each end of the tie lying between the two single slot fastening elements.

11. A tie according to claim 1, wherein each intermediate fastening element consists of at least two stepped slots arranged in parallel across the width of the tie.

References Cited

UNITED STATES PATENTS 3,303,541  2/1967  Beach.

FOREIGN PATENTS 719,021  11/1954  Great Britain.
751,748  7/1956  Great Britain.
823,478  11/1959  Great Britain.

DONALD A. GRIFFIN, Primary Examiner.